(12) United States Patent
Hughes

(10) Patent No.: US 7,770,143 B2
(45) Date of Patent: Aug. 3, 2010

(54) SYSTEM AND METHOD FOR DESIGN DEVELOPMENT

(76) Inventor: John M. Hughes, 45 Bluebird La., Hebron, CT (US) 06248

( * ) Notice: Subject to any disclaimer, the term of this patent is extended or adjusted under 35 U.S.C. 154(b) by 203 days.

(21) Appl. No.: 11/655,768

(22) Filed: Jan. 19, 2007

(65) Prior Publication Data

US 2007/0180416 A1      Aug. 2, 2007

Related U.S. Application Data

(60) Provisional application No. 60/760,523, filed on Jan. 20, 2006.

(51) Int. Cl.
G06F 17/50         (2006.01)
(52) U.S. Cl. .............................. 716/6; 716/1
(58) Field of Classification Search ..................... 716/1, 716/4–6; 717/102, 168
See application file for complete search history.

(56) References Cited

U.S. PATENT DOCUMENTS

| | | | |
|---|---|---|---|
| 4,525,599 A | 6/1985 | Curran et al. |
| 5,195,033 A | 3/1993 | Samph et al. |
| 5,513,994 A | 5/1996 | Kershaw et al. |
| 5,779,549 A | 7/1998 | Walker et al. |
| 5,794,207 A | 8/1998 | Walker et al. |
| 5,799,320 A | 8/1998 | Klug |
| 5,823,879 A | 10/1998 | Goldberg et al. |
| 5,827,070 A | 10/1998 | Kershaw et al. |
| 5,835,896 A | 11/1998 | Fisher et al. |
| 5,862,223 A | 1/1999 | Walker et al. |
| 5,916,024 A | 6/1999 | Von Kohorn |
| 5,933,811 A | 8/1999 | Angles et al. |
| 5,947,747 A | 9/1999 | Walker et al. |
| 5,963,916 A | 10/1999 | Kaplan |
| 5,970,475 A | 10/1999 | Barnes et al. |
| 5,987,302 A | 11/1999 | Driscoll et al. |
| 5,995,951 A | 11/1999 | Ferguson |
| 6,010,403 A | 1/2000 | Adam et al. |
| 6,012,984 A | 1/2000 | Roseman |
| 6,055,511 A | 4/2000 | Luebbering et al. |
| 6,088,679 A | 7/2000 | Barkley |

(Continued)

FOREIGN PATENT DOCUMENTS

WO      WO-97/39811      10/1997

OTHER PUBLICATIONS

TopCoder Press Release—InternetWire, May 29, 2001, "TopCoder addresses Demand for Elite Programmers with Coding Competitions", available at http://www.topcoder.com/tc?module=Static&d1=pressroom&d2=pr_052901.

(Continued)

*Primary Examiner*—Jack Chiang
*Assistant Examiner*—Binh C Tat
(74) *Attorney, Agent, or Firm*—Goodwin Procter LLP

(57)      ABSTRACT

This invention relates to a system and methods for developing designs. In one embodiment, a method includes electronically distributing a specification for a design to a distributed community of designers, receiving designs from each of a subset of the community of designers in response to the distributed design specification, screening received designs that do not meet the specification, facilitating evaluation of a subset of the received designs by a number of evaluators; and selecting a preferred design in response to the facilitated evaluation of the designs.

8 Claims, 5 Drawing Sheets

U.S. PATENT DOCUMENTS

| | | | |
|---|---|---|---|
| 6,112,049 A | 8/2000 | Sonnenfeld | |
| 6,174,237 B1 | 1/2001 | Stephenson | |
| 6,193,610 B1 | 2/2001 | Junkin | |
| 6,224,486 B1 | 5/2001 | Walker et al. | |
| 6,264,560 B1 | 7/2001 | Goldberg et al. | |
| 6,293,865 B1 | 9/2001 | Kelly et al. | |
| 6,301,574 B1 | 10/2001 | Thomas et al. | |
| 6,341,212 B1 | 1/2002 | Shende et al. | |
| 6,345,239 B1 | 2/2002 | Bowman-Amuah | |
| 6,356,909 B1 | 3/2002 | Spencer | |
| 6,397,197 B1 | 5/2002 | Gindlesperger | |
| 6,408,283 B1 | 6/2002 | Alaia et al. | |
| 6,427,132 B1 | 7/2002 | Bowman-Amuah | |
| 6,431,875 B1 | 8/2002 | Elliott et al. | |
| 6,434,738 B1 | 8/2002 | Arnow | |
| 6,453,038 B1 | 9/2002 | McFarlane et al. | |
| 6,513,042 B1 | 1/2003 | Anderson et al. | |
| 6,532,448 B1 | 3/2003 | Higginson et al. | |
| 6,569,012 B2 | 5/2003 | Lydon et al. | |
| 6,578,008 B1 | 6/2003 | Chacker | |
| 6,604,997 B2 | 8/2003 | Saidakovsky et al. | |
| 6,606,615 B1 | 8/2003 | Jennings et al. | |
| 6,631,404 B1 | 10/2003 | Philyaw | |
| 6,636,892 B1 | 10/2003 | Philyaw | |
| 6,658,642 B1 | 12/2003 | Megiddo et al. | |
| 6,659,861 B1 | 12/2003 | Faris et al. | |
| 6,662,194 B1 | 12/2003 | Joao | |
| 6,718,535 B1 | 4/2004 | Underwood | |
| 6,761,631 B2 | 7/2004 | Lydon et al. | |
| 6,791,588 B1 | 9/2004 | Philyaw | |
| 6,824,462 B2 | 11/2004 | Lydon et al. | |
| 6,859,523 B1 | 2/2005 | Jilk et al. | |
| 6,895,382 B1 | 5/2005 | Srinivasan et al. | |
| 6,910,631 B2 | 6/2005 | Knowles et al. | |
| 6,915,266 B1 | 7/2005 | Saeed et al. | |
| 6,938,048 B1 | 8/2005 | Jilk et al. | |
| 6,952,678 B2 | 10/2005 | Williams et al. | |
| 6,963,850 B1* | 11/2005 | Bezos et al. | 705/26 |
| 6,970,677 B2 | 11/2005 | Jongsma et al. | |
| 6,984,177 B2 | 1/2006 | Lydon et al. | |
| 6,993,496 B2 | 1/2006 | Pittelli | |
| 7,027,997 B1 | 4/2006 | Robinson et al. | |
| 7,054,464 B2 | 5/2006 | Poor | |
| 7,155,400 B1 | 12/2006 | Jilk et al. | |
| 7,162,198 B2 | 1/2007 | Kuntz et al. | |
| 7,162,433 B1 | 1/2007 | Foroutan | |
| 7,207,568 B2 | 4/2007 | France et al. | |
| 7,234,131 B1 | 6/2007 | Speyrer et al. | |
| H2201 H | 9/2007 | Stytz et al. | |
| 7,292,990 B2 | 11/2007 | Hughes | |
| 7,300,346 B2 | 11/2007 | Lydon et al. | |
| 7,311,595 B2 | 12/2007 | Lydon et al. | |
| 7,331,034 B2 | 2/2008 | Anderson | |
| 7,386,831 B2 | 6/2008 | Flanagan | |
| 7,392,285 B2 | 6/2008 | Philyaw | |
| 7,401,031 B2 | 7/2008 | Hughes | |
| 7,412,666 B2 | 8/2008 | Philyaw | |
| 7,416,488 B2 | 8/2008 | Peterson et al. | |
| 2001/0032170 A1 | 10/2001 | Sheth | |
| 2001/0032189 A1 | 10/2001 | Powell | |
| 2001/0034631 A1 | 10/2001 | Kiselik | |
| 2001/0037281 A1 | 11/2001 | French et al. | |
| 2001/0039529 A1 | 11/2001 | Hoffman | |
| 2001/0049615 A1 | 12/2001 | Wong et al. | |
| 2001/0049648 A1 | 12/2001 | Naylor et al. | |
| 2002/0026321 A1 | 2/2002 | Faris et al. | |
| 2002/0035450 A1 | 3/2002 | Thackston | |
| 2002/0038221 A1 | 3/2002 | Tiwary et al. | |
| 2002/0069076 A1 | 6/2002 | Faris et al. | |
| 2002/0077963 A1 | 6/2002 | Fujino et al. | |
| 2002/0107972 A1 | 8/2002 | Keane | |
| 2002/0116266 A1 | 8/2002 | Marshall | |
| 2002/0120501 A1 | 8/2002 | Bell et al. | |
| 2002/0120553 A1 | 8/2002 | Bowman-Amuah | |
| 2002/0124048 A1 | 9/2002 | Zhou | |
| 2002/0161696 A1 | 10/2002 | Gebert | |
| 2003/0009740 A1 | 1/2003 | Lan | |
| 2003/0018559 A1 | 1/2003 | Chung et al. | |
| 2003/0046681 A1 | 3/2003 | Barturen et al. | |
| 2003/0060910 A1 | 3/2003 | Williams et al. | |
| 2003/0192029 A1 | 10/2003 | Hughes | |
| 2004/0210550 A1 | 10/2004 | Williams et al. | |
| 2005/0027582 A1 | 2/2005 | Chereau et al. | |
| 2005/0160395 A1* | 7/2005 | Hughes | 717/102 |
| 2006/0052886 A1 | 3/2006 | Lydon et al. | |
| 2006/0184384 A1 | 8/2006 | Chung et al. | |
| 2006/0184928 A1* | 8/2006 | Hughes | 717/168 |
| 2006/0248504 A1 | 11/2006 | Hughes | |
| 2007/0180416 A1 | 8/2007 | Hughes | |
| 2007/0186230 A1 | 8/2007 | Foroutan | |
| 2007/0220479 A1 | 9/2007 | Hughes | |
| 2007/0226062 A1 | 9/2007 | Hughes et al. | |
| 2007/0244749 A1 | 10/2007 | Speiser et al. | |
| 2007/0281771 A1 | 12/2007 | Lydon et al. | |
| 2007/0288107 A1 | 12/2007 | Fernandez-Ivern et al. | |
| 2008/0027783 A1 | 1/2008 | Hughes et al. | |
| 2008/0052146 A1 | 2/2008 | Messinger et al. | |
| 2008/0167960 A1 | 7/2008 | Hughes | |
| 2008/0196000 A1 | 8/2008 | Fernandez-Ivern et al. | |
| 2008/0228681 A1 | 9/2008 | Hughes | |
| 2008/0281610 A1 | 11/2008 | Yoshida et al. | |
| 2008/0281616 A1 | 11/2008 | Johnson | |
| 2008/0320436 A1 | 12/2008 | Hughes | |
| 2009/0007074 A1 | 1/2009 | Campion et al. | |
| 2009/0024457 A1 | 1/2009 | Foroutan | |
| 2009/0203413 A1 | 8/2009 | Jefts et al. | |

OTHER PUBLICATIONS

The Rules of the 2001 ACM Regional Programming Contests Sep. 10, 2001, Final (from http://web.archive.org/web/20011224151037/icpc.baylor.edu/icpc/Regionals/About.htm), Retrieved from the Internet Mar. 5, 2009 (5 pages).

ICFP Programming Contest Home Page—The Third Annual ICFP Programming Contest, Retrieved from the Internet Mar. 5, 2009: http://web.archive.org/web/20000816191608/http:/www.cs.cornell.edu/icfp.

Programming Contest Control System (PC2) (<http://ecs.csus.edu/pc2/>, internet archive, retrieved from the internet Mar. 5, 2009) 2 pages.

Google Programming Contest, First Annual Google Programming Contest, http://web.archive.org/web/20020207103456/http://www.google.com/programming-contest/index.html Retrieved from the Internet Mar. 5, 2009, 4 pages.

PCT/US2007/010414, International Preliminary Report on Patentability, Written Opinion of the International Searching Authority, Oct. 30, 2008, pp. 1-5.

National Ratings System, Sep. 1993 [retrieved] on Jun. 16, 2003, [Retrieved from the Internet <http://members.ozemail.com.au/aspansw/nrs.html.

Nebraska Wins Collegiate Computer Programming Regional to Qualify for World Finals, Scarlet, Nov. 20, 1998 [retrieved on Jun. 16, 2003 from the Internet: http://www.unl.edu/scarlet/v8n34/v8n34features.html.

Professor Keeps Score When Top Programmers Compete, California State University, Sacremento, Apr. 8, 1999 [retrieved on Jun. 16, 2003] Retrieved from the Internet: http://www.csus.edu/news/program.html.

USTA Rankings Systems Rules, Apr. 1998 [Retrieved online Oct. 20, 2008] <http://www.tornado.org/NATA/ByLaws/RankRules.html>.

AssessNet Features and Benefits http://web.archive.org/web/20001018210736/www.assessnet.com/features.htm. Retrieved on Oct. 21, 2008 (2 pages).

Brainbench Standard Assessments: http://www.brainbench.com/xml/bb/business/productsservices/products/assessments/standardassessm, Retrieved on Mar. 10, 2004 (1 page).

Glickman, Mark E., The Glicko-2 system for Rating Players in Head-to-head Competition, Jul. 2000, Retrieved from the Internet on Oct. 23, 2003 at http://math.bu.edu/people/mg/ratings/glicko2desc.pdf.

Jones, Albyn, International Soccer Ranks and Ratings, Statistics in Sports, vol. 2, Issue 1, Spring 2000 [retrieved on Jun. 16, 2003].

Prove It! http://web.archive.org/web/20001018111056/www.proveit.com/ Retrieved on Oct. 21, 2008 (1 page).

Reviewnet Screening: http://web.archive.org/web/20010110233500/http://reviewnet.net/ReviewNetScreening.html [Retrieved on Oct. 21, 2008 (3 pages).

U.S. Chess Federation : Rating Algorithm [Retrieved online Dec. 3, 2002] <http://www.uschess.org>.

WebValuate.com http://web.archive.org/web20001019020801/http://webvaluate.com/ Retrieved on Oct. 21, 2008 (1 page).

IPER for PCT/US07/009477 Dec. 16, 2008—6 pages.
WO for PCT/US07/009477 Nov. 7, 2008—5 pages.
ISR for PCT/US07/12792 Nov. 10, 2008—3 pages.
IPER for PCT/US07/12792 Nov. 10, 2008—3 pages.
WO for PCT/US07/12792 Nov. 10, 2008—3 pages.

An Overview of PC2s [online], [Retrieved on Jul. 24, 2006]. Retrieved from the Internet: http://hera.ecs.csus.edu/pc2/pc2desc.html, Revised Oct. 18, 2002.

"I0I Software Team" [online], [Retrieved on Jul. 24, 2006]. Retrieved from the Internet: http://olympiads.win.tue.nl/ioi/st/.

Ed's Programming Contest Problem Archive [online], [Retrieved on Jul. 25, 2006]. Retrieved from the Internet: http://www.karrels.org/Ed/ACM/index.html.

ACM/IBM Quest for Java 2000 [online], [Retrieved on Jul. 25, 2006]. Retrieved from the Internet:http://www.acm.org/jquest/.

"JavaWorld Code Masters" [online], [Retrieved on Jul. 25, 2006]. Retrieved from the Internet: http://infoart.udm.ru/it/news/src/20000052.htm.

"Hack the Web for Fun!" [online], [Retrieved on Jul. 26, 2006]. Retrieved from the Internet: http://web.archive.org/web/20000816205559/http://java.sun.com/contest/external.html.

"Brainbench the measure of achievement" [online], [Retrieved on Nov. 9, 2000]. Retrieved from the Internet: http://www.brainbench.com/xml/bb/homepage.xml.

"Problem Set Archive with Online Judge" [online], [Retrieved on Jul. 26, 2006]. Retrieved from the Internet: http://acm.uva.es/problemset/.

Lewis, "Tournaments become latest high-tech recruiting tool," The Boston Globe at C1, May 6, 2002.; http://www.cs.berkeley.edu/~hilfingr/programming-contest/acm-news-05-10-2002.txt—*Replacement text, retrieved from the Internet on Jul. 25, 2006.

Astrachan, O. "The Internet Programming Contest: A Report and Philosophy" Association for Computing Machinery, Feb. 1993; Retrieved from the Internet on Jul. 25, 2006 http://www.cs.dartmouth.edu/~dfk/papers/astrachan:contest.pdf.

"URCSC Computer Programming Contest" [online], http://www.mathcs.richmond.edu/~urcsc/contest/rules2.html, Retrieved from the Internet on Jul. 25, 2006.

Blecourt, "The Legacy of Arpad Elo: The Development of a Chess Rating System" University of Amsterdam, Dec. 1, 1998.

U.S. Chess Federation [online], [Retrieved on Dec. 3, 2002]. Retrieved from the Internet: http://www.uschess.org/about/about/htmi.

Carlton, Jim. Strutting their data, geeks go to battle for bucks and glory. Wall Street Journal, Mar. 11, 1994, col. 4, pA1(W) & pAl(e), ISSN 0193-241.

Fink, William & Joyce Dick. Computer Programming Tournament as a learning Experience. The Computer Education Quarterly. Summer 1989, vol. 11, Issue 2 pp. 46-52.

O'Sullivan, Kate. "Best of the Web: Testing Recruits, Net-Style" Dec. 2000, pp. 1-5. <http://pf.inc.com/magazine/20001201/21124.html>, Retrieved from the Internet on Jul. 28, 2006.

Flipcode. Coding contest [online]. 2000 [retrieved on Jul. 26, 2006]. Retrieved from the Internet: http://www.flipcode.com/cgi-bin/fcarticles.cgi?show=62761 URL:http://Nvww. fl ipcode.com/contest.shtml.

The Eiffel Stuggle 2000, Call for participation [online]. Aug. 2000, retrieved on Jul. 28, 2006. Retrieved from the Internet: URL: http://www.elj.com/eiffel/struggle2000/cfp/, entire document.

ICFP Functional Programming Contest, [online] 1998, [retrieved on Jul. 26, 2006]. Retrieved from the internet: URL: http://www.ai.mit.edu/extra/icfp-contest.

1999 ICFP Programming Contest, [online] 1999, [retrieved on Jul. 28, 2006]. Retrieved from the internet: URL: http://www.cs.virginia.edu/~jks6b/ocfp/.

"About CBDi" [online], [Retrieved on Jul. 28, 2006]. Retrieved from the Internet: http://www.cbdiforum.com/public/about.php3.

"ComponentSource: About Us" [online], [Retrieved on Jul. 28, 2006]. Retrieved from the Internet: http://www.componentsource.com/services/aboutcomponentsource.asp.

"Flashline 4 Provides Software Asset Management for Enterprise Programs" [online], [Retrieved on Jul. 28, 2006]. Retrieved from the Internet: http://www.flashline.com/fcm/fcm.jsp.

"About ComponentOne" [online], [Retreived on Jul. 28, 2006]. Retrieved from the Internet: http://www.componentone.com/Company.aspx?ItemType=1&TabTypeID=3&TabMapID=149&ItemID=0&SubCategoryTypeID=0&PanelIndex=2&TabID=176.

"Rogue Wave Corporate Information" [online], [Retrieved on Jul. 28, 2006]. Retrieved from the Internet: http://www.roguewave.com/corp/.

"LogicLibrary Company Overview" [online], [Retrieved on Jul. 28, 2006]. Retrieved from the Internet: http://www.logiclibrary.com/about_us/company_profile.php.

"/n software inc.—General Corporate Information" [online], [Retrieved on Jul. 28, 2006]. Retrieved from the internet: http://www.nsoftware.com/company/corporateinfo.aspx.

"ILOG Corportae Profile" [online], [Retrieved on Jul. 28, 2006]. Retrieved from the Internet: http://www.ilog.com/corporate/profile/.

"What is SourceForge.net" [online], [Retrieved on Jul. 28, 2006]. Retrieved from the Internet: http://sourceforge.net/docman/display_doc.php?docid=6025&group_id=1.

"CollabNet Corporate Background" [online], [Retrieved on Jul. 28, 2006]. Retrieved from the Internet: http://www.collab.net/media/pdfs/collabnet_background.pdf.

Office Action for US Patent No. 6,569,012 dated Jun. 27, 2002.
Office Action for US Patent No. 6,569,012 dated Aug. 21, 2002.
Final Office Action for US Patent No. 6,569,012 dated Dec. 6, 2002.
Office Action for U.S. Appl. No. 10/377,343 dated Jul. 25, 2003.
Office Action for U.S. Appl. No. 10/377,344 dated Jul. 25, 2003.

International Search Report for International Patent Application Serial No. PCT/US03/10537 dated Jul. 17, 2003.

Web Pages from Slashdot.org: http:Hdevelopers.slashdot.org/developers/04/01/26/1834209.shtml?tid=136&tid=155&tid=187&tid=99 retrieved from the Internet on Jan. 28, 2004.

Web Pages from Scwatch.net: http://www.scwatch.net/modules.php?name=Forums&file=viewtopic&t=16 Retrieved from the Internet on Jan. 28, 2004.

"IBM Patents Method for Paying Open Source Volunteers".posted at http://www.theinquirer,net/Default.aspx?article—13813 Retrieved from the Internet on Jan. 29, 2004.

Web page www. cosource.com (Mar. 21, 2000), as provided by web.archive.org on Mar. 31, 2006 at http://web.archive.org/web/20003021603 16/www.cosource.com.

Weinrich and Altmann, "An Object-oriented Infrastructure for a Cooperative Software Development Environment", 1997, Linz, Austria.

Van Wegberg and Berends, "Competing communities of users and developers of computer software: competition between open source software and commercial software", May 2000, i, 1-13, University of Maastrict, The Netherlands.

Voas, "Certifying Off-the-Shelf Software Components", Jun. 1998, 53-59, Sterling, VA.

Skaf, Charoy and Godart, "Maintaining Consistency of Cooperative Software Development Activities", Vandoeuvre-les-Nancy, France.

Ward, Donald L. "Aircraft Information Systems Support SOL 9-Bj2-Z19-1-31I DUE 061401 POC" 2 pages, Jun. 11, 2001.

Bennett, Lynda et al. "Forging an Outsourcing Partnership that Works" IPCC 94, pp. 406-410, 1994.

Dhillon, Gurpett Outsourcing of IT service Provision Issues, Concerns and Some Case Examples, 20 pages, Fall 2002.

Forsberg et al., "Managing Outsourcing of Software Development" 48 pages, Spring 2001.

Cooper, Jack et al. "Software Acquisition Capability Maturity Model (SA-CMM_Version 1.03)", Mar. 2002, CMU, Whole Manual.

http://www.programmingbids.com/, informational webpages retrieved from the internet Nov. 29, 2001, 15 pages.

Kirsner, Scott, "The New Rules", http://www.topcoder.com/index?t=news_events&c=article_bglobe, downloaded from the Internet Jun. 21, 2006, 4 pages.

Pohl, Wolfgang, Suggestions for CS Competitions (Task, Exam, Automatic Grading) Powerpoint presentation slides printout, 7 pages, Dagstuhl, Germany, Jan. 24, 2006.

Pohl, Wolfgang, "Classification of Computer Science Competitions" Powerpoint presentation slides printout, 7 pages, Dagstuhl, Germany, Jan. 23, 2006.

Verhoeff, Tom "The IOI Is (Not) a Science Olympiad", Powerpoint presentation slides printout, Jan. 24, 2006, The Netherlands.

Verhoeff, Tom "The IOI Is (Not) a Science Olympiad", text and description, Oct. 2005, The Netherlands, 9 pages.

Cormack, Gordon "Statistical Analysis of IOI Scoring" Powerpoint presentation slides printout, Jan. 24, 2006.

Retrieved from the Internet, http://www.bwinf.de/competition-workshop/ information sheet, Jul. 12, 2006.

Retreived from the Internet, http://www.bwinf.de/competition-workshop/papers.html, listing of accepted papers, Jul. 12, 2006.

Programming bids Buyers Request Programmers Bid—Retrieved from the internet, <http://rfq.programmingbids.com/cgi-bin/rfq/feedback.cgi?p=mamoon> Feedback provided by buyers by username mamoon, downloaded Aug. 8, 2006.

TopCoder Homepage, <http://web.archive.org/web20010516213901/http://www.topcoder.com/> retrieved Oct. 19, 2006 (1 page).

International Search Report and Written Opinion for PCT/US2007/009477, dated mailed Nov. 21, 2008, 7 pages.

van der Vegt, Willem, "The CodeCup, an annual game programming competition" "The Dutch Olympiad in Informatics" Powerpoint presentation slides printout (Jan. 2006).

Annavajjala, "JAVA Challenge Software Project" Master's Thesis submitted to the Department of Computer Science and Electrical Engineering at West Virginia University (pp. i - 107) (1999).

Boersen, Raewyn et al. "Programming Contests: Two Innovative Models from New Zealand", text and description (Jan. 2006).

Cormack, Gord et al. "Structure, Scoring and Purpose of Computing Competition (Part 2)" Powerpoint presentation slides printout, 25 pages (Jan. 2006).

Cormack, Gordon "Random Factors in IOI Test Case Selection" text and description, University of Waterloo, Ontario, Canada (Jan. 2006).

Cormack, Gordon et al. "Structure, Scoring and Purpose of Computing Competition" Powerpoint presentation slides printout, 10 pages (Jan. 2006).

Cormack, Gordon et al. "Structure, Scoring and Purpose of Computing Competition", text and description, University of Waterloo (Jan. 2006).

Cormack, Gordon, "Statistical Analysis of IOI Scoring" Brief description (Jan. 22, 2006).

Dagiene, Valentina "Competition in Information Technology—learning in an attractive way", text and description, pp. 1-7 (Jan. 2006).

Fisher, Maryanne et al. "Gender and Programming Contests: Mitigating Exclusionary Practices" Powerpoint presentation slides printout (Jan. 2006).

Fisher, Maryanne et al. "Gender and Programming Contests: Mitigating Exclusionary Practices" text and description (Jan. 2006).

Forisek, Michal "On suitability of programming competition tasks for automated testing" Powerpoint presentation slides printout, 11 pages (Jan. 2006).

Forisek, Michal "On suitability of programming competition tasks for automated testing" text and description, pp. 1-9 (Jan. 2006).

Manzoor, Shahriar "Analyzing Programming Contest Statistics" (http://online-judge.uva.es/contest/) Southeast University, Dhaka, Bangladesh (Jan. 2006).

Manzoor, Shahriar "Analyzing Programming Contest Statistics" (http://online-judge.uva.es/p) Southeast University, Dhaka, Bangladesh (Jan. 2006).

Michalski, Marcin et al. "Plug & Play Contest System" (SIO.NET), Basic guidelines sheet, Institute of Informatics, Warsaw University, Poland (Jan. 2006).

Michalski, Marcin et al. "Plug & Play Contest System" (SIO.NET), text and description, Institute of Informatics, Warsaw University, Poland (Jan. 2006).

Opmanis, Martins "Possible ways to improve Olympiads in Informatics" Powerpoint presentation slides printout (Jan. 2006).

Opmanis, Martins "Possible ways to improve Olympiads in Informatics" text and description, Institute of Mathematics and Computer Science, University of Latvia, pp. 1-11 (Jan. 2006).

Phillips, Margot et al. "Programming Contests: Two Innovative Models from New Zealand", Powerpoint presentation slides printout (Jan. 2006).

Pohl, Wolfgang, "Computer Science Competitions for High School Students—Approaches to Classification and New Task Types", Extended Abstract, 7 pages (Jan. 2006).

Pohl, Wolfgang, "Computer Science Competitions for High School Students—Approaches to Classification and New Task Types", text and description, 8 pages (Jan. 2006).

van der Vegt, Willem, "The CodeCup, an annual game programming competition" Paper for IOI-workshop, pp. 1-11 (Jan. 2006).

Wang, Hong et al. "Visualization, Antagonism and Opening—Towards the Future of the IOI Contest" for 1st Workshop on Computer Science Competitions Reform, Tsinghua University, Beijing, China (Jan. 2006).

Yakovenko, Bogdan "50% rule should be changed." pp. 1-4 (Jan. 2006).

* cited by examiner

SYSTEM AND METHOD FOR DESIGN DEVELOPMENT

CROSS-REFERENCE TO RELATED APPLICATIONS

The application claims priority to U.S. provisional patent application Ser. No. 60/760,523, filed on Jan. 20, 2006.

TECHNICAL FIELD

This invention relates to computer-based methods and systems for developing designs and, more particularly, to methods and systems for facilitating the distributed development of designs.

BACKGROUND INFORMATION

At some point in its existence, a company faces the difficult task of selecting a design, such as a corporate logo. Like many designs, corporate logos have an aesthetic quality, and so different people have an affinity for different appearances and styles. It can be challenging, therefore, to design a logo that is appreciated by many different people. At the same time, however, a logo also is an important part of the public presentation of a company. It is therefore very important to a company to quickly and inexpensively select a logo that will be appreciated by many different people within a company, as well as by the company's customers and business partners.

SUMMARY OF THE INVENTION

Other types of creative design projects, including without limitation such projects as web page design, user interface design, banner and other advertising design, stationary design, software application design, music and song composition, and the like all have characteristics that are similar to logos, in the sense that they have both aesthetic and business aspects, and help form an impression that a customer, end user, audience member, or business partner has of the organization and/or its products.

Organizations need a way to quickly and efficiently develop designs that will be received positively by their target audience. It can be difficult to efficiently generate a number of different ideas and then identify the one that will be best received by the target audience. One technique that can help address these concerns is to use a design competition, in which a number of design developers submit candidate designs for selection. Having different people work on the design development helps generate many different approaches.

Once different designs are generated, however, it is still necessary to select the design(s) preferred by the target audience for the design. In one embodiment, a small group of people choose the best design or designs from the submitted candidate designs. In another embodiment, a small group selects a number of submitted candidates, and then provides the candidate designs to a larger group of people for review. Reviewing the candidates individually, the larger group collectively reviews the design candidates and selects the best design or designs of the candidates for use by the organization.

Once selected, the design developer who developed the selected design, or another design developer, can be engaged for future work in connection with the design.

In general, in one aspect, a method for developing a design includes electronically distributing requirements for a design to a distributed community of designers, receiving designs from each of a subset of the community of designers in response to the design requirements, facilitating review of a subset of the received designs by a number of reviewers; and selecting a preferred design in response to the facilitated review of the designs.

In general, another aspect of the invention relates to a system for implementing the methods just described. The system includes a communications module for electronically distributing requirements for a design to a distributed community of designers and receiving designs from each of a subset of the community of designers in response to the design requirements. The system includes an review module for facilitating evaluation of a subset of the received designs by a number of reviewers; and a selection module for selecting a preferred design in response to the facilitated review of the designs.

In one embodiment of this aspect of the invention, the system further includes a rating engine for rating the skills of the members of the distributed community of designers. The system can, in some embodiments, further include a reviewing module to allow members of the distributed community to review designs.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
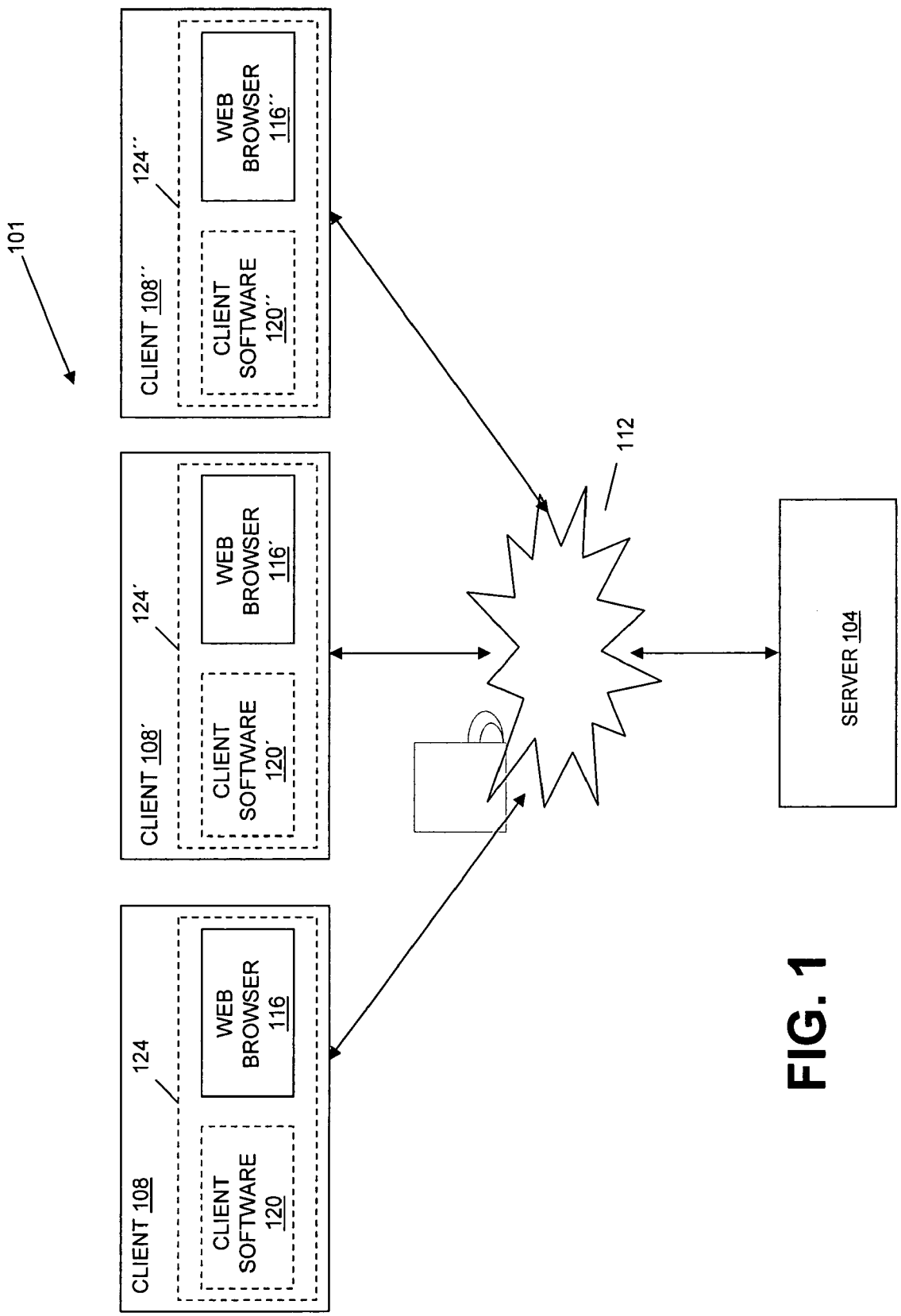
FIG. 1 is a block diagram of an embodiment of a distributed design development system having a server according to the invention.

Referring to FIG. 1, in one embodiment, a distributed design development system 101 includes at least one server 104, and at least one client 108, 108', 108", generally 108. As shown, the distributed design development system includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 could also be implemented on such hardware as a smart or dumb terminal, network computer, wireless device, wireless telephone, information appliance, workstation, minicomputer, mainframe computer, or other computing device, that is operated as a general purpose computer, or a special purpose hardware device used solely for serving as a client 108 in the distributed design development system.

Generally, in some embodiments, clients 108 can be operated and used by design developers to participate in various design development activities. Examples of design development activities include, but are not limited to participation the design development projects described here. Clients 108 can also be operated by entities who have requested that the design developers develop designs (e.g., customers). The customers may use the clients 108 to review designs developed by the design developers, post specifications for the development of designs, view information about the design developers, as well as other activities described here. The clients 108 may also be operated by a facilitator, acting as an intermediary between the customers and the design developers.

In various embodiments, the client computer 108 includes a web browser 116, client software 120, or both. The web browser 116 allows the client 108 to request a web page or other downloadable program, applet, or document (e.g., from the server 104) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, in another embodiment, the client 108 automatically makes requests with the web browser 116. Examples of commercially available web browser software 116 are INTERNET EXPLORER, offered by Microsoft Corporation, NETSCAPE NAVIGATOR, offered by AOL/Time Warner, or FIREFOX offered by the Mozilla Foundation.

In some embodiments, the client 108 also includes client software 120. The client software 120 provides functionality to the client 108 that allows a design developer to participate, supervise, facilitate, or observe design development activities described above. The client software 120 may be implemented in various forms, for example, it may be in the form of a Java applet that is downloaded to the client 108 and runs in conjunction with the web browser 116, or the client software 120 may be in the form of a standalone application, implemented in a multi-platform language such as .Net or Java, or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links (802.11, bluetooth, etc.), and so on, and any combination. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Non-limiting examples of networks that can serve as or be part of the communications network 112 include a wireless or wired ethernet-based intranet, a local or wide-area network (LAN or WAN), and/or the global communications network known as the Internet, which may accommodate many different communications media and protocols.

The servers 104 interact with clients 108. The server 104 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of users and the size of the user base. For example, the server 104 may be or may be part of a logical group of one or more servers such as a server farm or server network. As another example, there may be multiple servers 104 that may be associated or connected with each other, or multiple servers could operate independently, but with shared data. In a further embodiment and as is typical in large-scale systems, the application software may be implemented in components, with different components running on different server computers, on the same server, or some combination.

In some embodiments, the server 104 also can include a contest server, such as described in U.S. Pat. Nos. 6,569,012 and 6,761,631, entitled "Systems and Methods for Coding Competitions" and "Apparatus and System for Facilitating Online Coding Competitions" respectively, both by Lydon et al, and incorporated by reference in their entirety herein.

In one embodiment, the server 104 and clients 108 enable the distributed design development of a design by one or more developers, which developers may or may not be associated with the entity requesting the development of the design.

In one embodiment, the design is an aesthetic design. Generally, an aesthetic design is a representation of a decorative, artistic and/or technical work that is created by the designer. For example, the design can be a graphic design, such as a logo, a graphic, or an illustration. The design can be a purposeful or inventive arrangement of parts or details. For example, the design can be the layout and graphics for a web page, web site, graphical user interface, and the like. The design can be a basic scheme or pattern that affects and controls function or development. For example, the design can be a prototype of a web page or pages, a software program or an application. As another example, the design can be a product (including without limitation any type of product, e.g., consumer product, industrial product, office product, vehicle, etc.) design or prototype. The design also can be a general or detailed plan for construction or manufacture of an object. For example, the design can be a product design. The design can be the design for a computer program, as described in co-pending U.S. patent application Ser. No. 11/035,783, filed Jan. 14, 2005.

In one embodiment, the design is a logo that a company intends to use on its web site, business cards, signage, stationary, and/or marketing collateral and the like. In another embodiment, the design is a web page template, including colors, graphics, and text layout that will appear on various pages within a particular web site.

In one embodiment, the design is a requirements specification for a software program, including the requirements that the program must meet.

Figure 2:
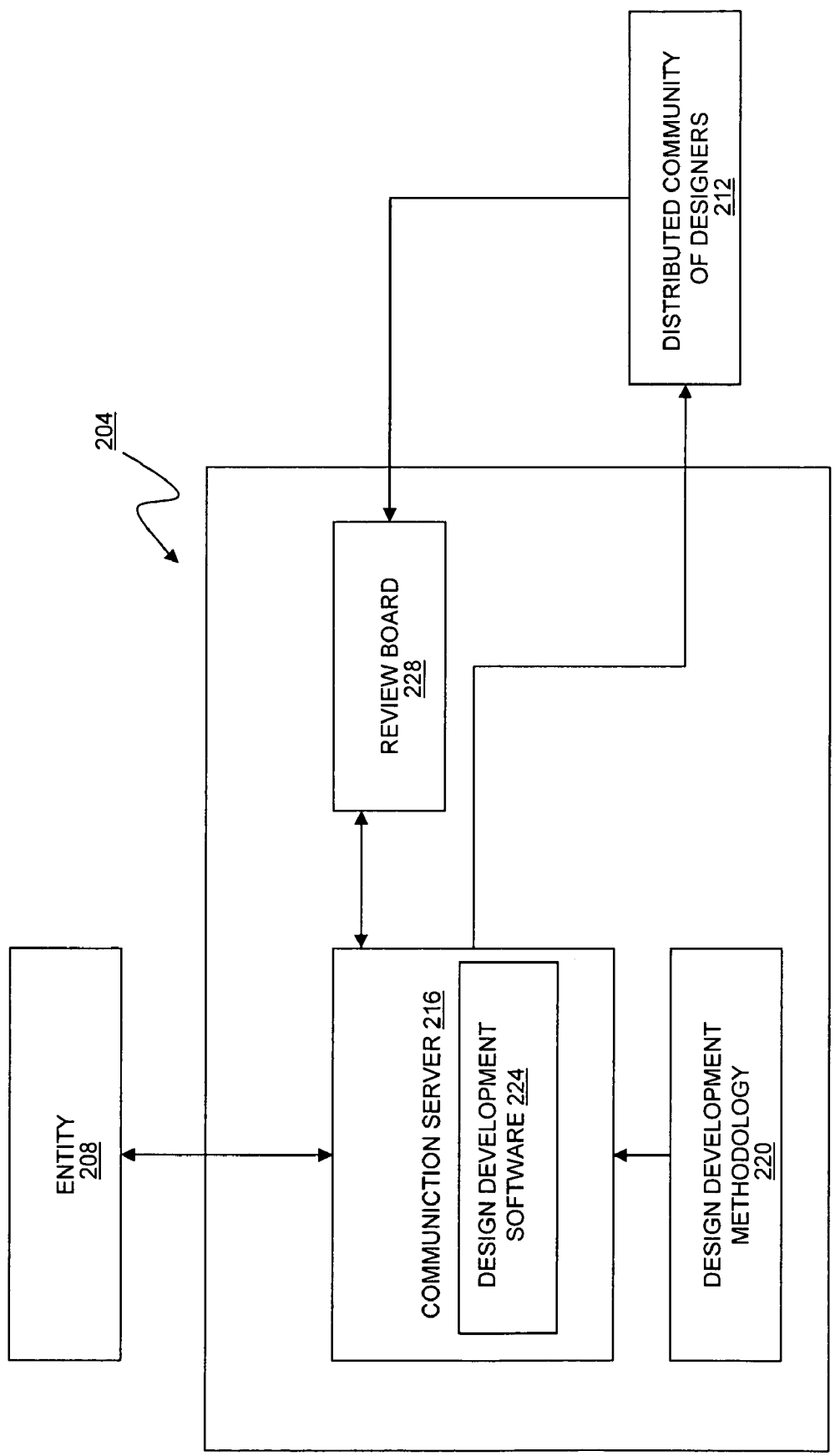
FIG. 2 is a block diagram of one embodiment of a design development domain according to an embodiment of the invention.

Referring to FIG. 2, a design development domain 204 can be used to provide an entity 208 with high-quality designs. One or more design developers can be identified and/or selected by various methods from a distributed community of designers 212, and subsequently used to develop designs. For example, the designers can be employees of, consultants to, or members of an organization, enterprise, or a community fostering collaborative and distributed design development. In some cases, the designers can have no other formal or informal relationship to each other. In some embodiments, one or more of the designers can act as a design project manager who is responsible for organizing and coordinating the efforts of other developers. The design project manager may also specify items such as, without limitation, the cost of the project, the project schedule, and the project risks. In one embodiment, the project manager creates a project plan for the project, which may include, without limitation, an estimated project cost and schedule, and a requirements document describing, for example, the parameters of the design, and the scope and risks of the project.

In some embodiments, the developers may include architects, designers, programmers, quality assurance engineers, as well as other design development roles as described in co-pending U.S. patent application Ser. No. 10/408,402, entitled "Method and Systems for Software Development" by Hughes, and incorporated by reference in its entirety herein.

In one embodiment, the design development domain 204 includes a communication server 216, design constraints/methodology 220, design development software 224, and a review board 228. The communication server provides a conduit through which the external entity 208, the community of designers 212, and the review board 228 can interact, for example, to provide documentation, submit designs, elicit and offer feedback, review submitted designs, and potentially rate and/or select submitted designs. In some embodiments, the communication server is or operates as part of the server 104 as described above, whereas in other cases the communication server may be a separate server, which may be operated by and/or outsourced to an application service provider (ASP), internet service provider (ISP), or other third-party.

The structured design development methodology 220 provides a framework for the development of designs. The methodology 220 specifies a common vocabulary, a fixed set of deliverables, as well as any other aspects of the design development process. Furthermore, by using a structured methodology, the participants, (e.g., designers 212, the entity 208) can communicate effectively, and the outputs of each design process step are known and can be verified, thus reducing the cost and time necessary to produce quality designs.

The design development software 224 provides an operational mechanism for implementing the methodology 220, and a design development environment in which the designers can do one or more of develop, alter, combine, view, test, submit, and verify designs. In some embodiments, as shown, components of the design software 224 may reside on the server 104, whereas some components may be included in client software residing on a client, e.g., as described above. For example, the design development software 224 can include one or more stand-alone software applications that execute on a client 108. The design development software 224 optionally can include one or more modules such as a design library, from which designers can access previously developed designs and documentation templates; a documentation feature that provides information about design terms, syntax, and functions; as well as other useful functions.

Figure 3:
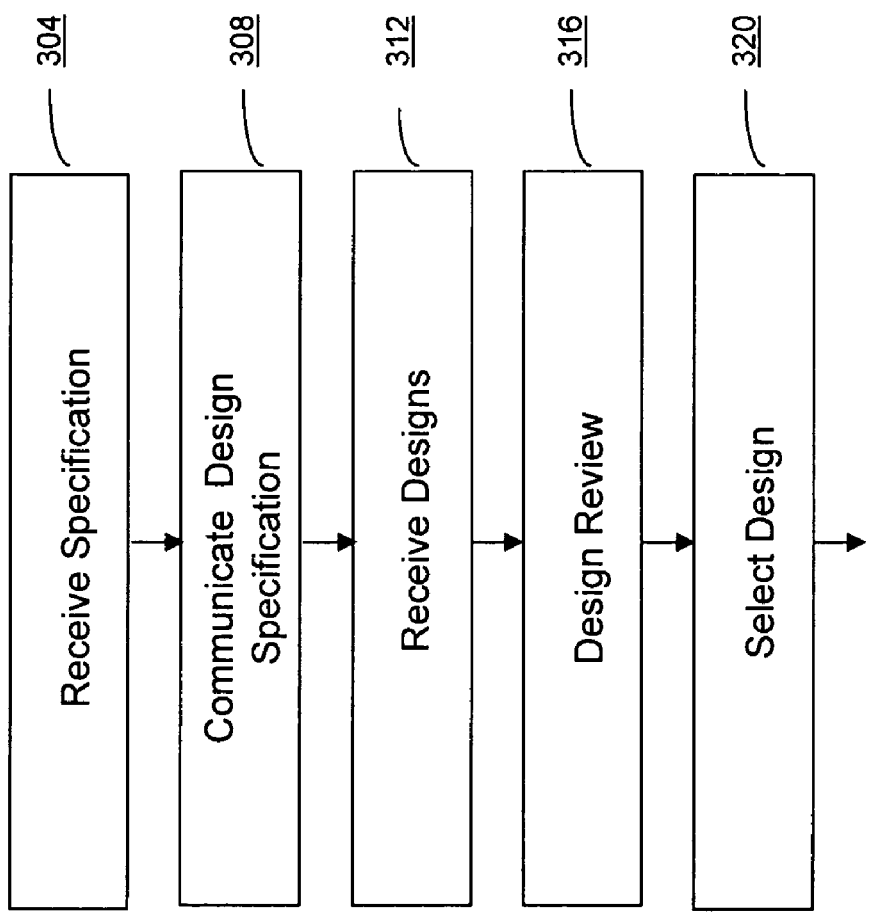
FIG. 3 is a flow chart depicting steps performed in developing a design according to an embodiment of the invention.

FIG. 3 provides a summary illustration of one embodiment of a method for developing a design, for example, using the design development domain 204 described above. The communication server 216 receives a specification (STEP 304) describing the desired design. The specification can include such information as the type of design, the size of the design, the size and color requirements, desired or undesired themes for the design, background information for creating the design, acceptable files types and formats for the submission, required documentation, and the like. The specification is then communicated to the distributed community of designers 212 (STEP 308). The specification can be communicated by posting to a web site that is accessed by members of the distributed community of designers. The specification can be communicated via email, instant message (IM), or through any other suitable communication technique. The specification can also include any timing deadlines for response, and the prize to be paid for one or more selected (e.g., winning) design(s). For example, a prizes can be awarded for first, second, and third place, and the prizes described in the specification.

One or more of the design developers in the community 212 creates a design in response to the requirements described in the specification. Once completed, the design(s) are communicated to, and received at the server 104 (STEP 312). The submitted design(s) are then subject to a design review process (STEP 316). In one embodiment, one or more reviewers (e.g., skilled, experienced and/or highly rated experts, focus groups, a customer, etc.) compare the design(s) to the specification, and evaluate the submissions on their implementation of the requirements (e.g., compliance with the methodology 220) and the overall aesthetic nature of the design.

In one embodiment, one or more designs that are the "best" of the submissions are selected in response to the evaluations (STEP 320).

Figure 4:
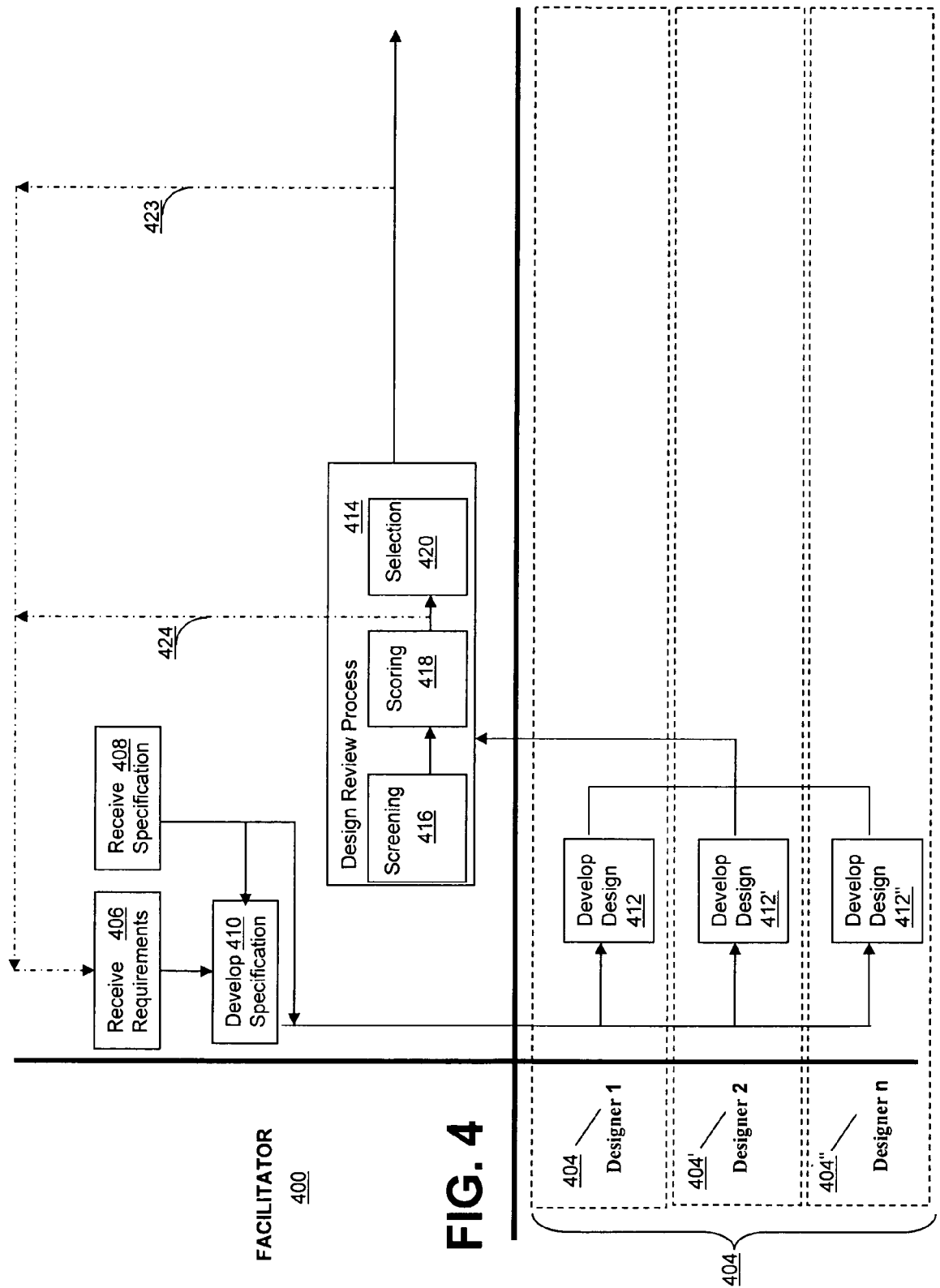
FIG. 4 is a flow chart depicting an overview of the operation of an embodiment of the invention.

FIG. 4 provides one possible implementation of the general method described above. In some such embodiments, the design development process is monitored and managed by a facilitator 400. The facilitator 400 can be any individual, group, or entity capable of performing the functions described here. In some cases, the facilitator 400 can be selected from the distributed community of design developers 208 based on, for example, success with previously submitted designs and/or achieving a high ranking. In other cases, the facilitator 400 can be appointed or supplied by the entity (e.g., entity 208) requesting the development of the design, and thus oversee the design development process for further assurance that the end product will comport with the specifications.

Initially, the facilitator 400 receives input from an entity (not shown) wishing to have a design developed on their behalf. The entity can be, for example, a company looking to have one or more computer programs designed and/or developed for internal use, or as portions of larger applications that they intend to sell commercially. The entity can be, for example, a company looking to redesign its web pages. The entity can be, for example, a company that would like to have a corporate logo designed. The entity can be, for example, a company that would like a design for a banner advertisement to be displayed on Internet web sites. In some cases, the entity provides a detailed specification with the requirements for the design, and in other cases only a short list of requirements may be provided. The facilitator receives either the short list of requirements (STEP 406), the full specification (STEP 408), or in some cases both from the external entity. If, however, no specification is provided, or if the specification needs revisions to conform to the methodology, the facilitator can develop a specification in accordance with the requirements (STEP 410). For example, the requirements may describe only the appearance of the design, while the specification will include the technical requirements for submission (e.g., file format, graphic size, and the like). In some cases, one or more members 404 of the design development community 212 may be asked to develop the specification, and in some cases multiple specifications may be submitted, with one of the submissions selected as the final specification to be used for guiding the design development effort.

In some cases, the specification is assigned a difficulty level, or some similar indication of how difficult the facilitator, entity, or other evaluator of the specification, believes it will be to produce a design according to the specification. The difficulty level may, in some cases, also be based on the effort believed to be necessary to complete the task, and the time allotted to complete the task. The difficulty level may be expressed in any suitable manner, for example as a numerical measure (e.g., a scale of 1 to 10), a letter grade, or a descriptive such as easy, medium, or hard. For example, a specification for the design of a web site with many color and text constraints may have a difficulty level of 9 on a scale of 1 to 10, whereas a simple logo design that is to be used on a web site may be assigned a difficulty level of 2. If there are additional practical constraints, for example if the design is needed in a short amount of time (e.g., two days), the difficulty level optionally may be increased due to the tight time constraints. In some embodiments, an award to the designer (e.g., money, skill rating, etc.) that submits the selected design may be produced or adjusted based in part on the difficulty level associated with the specification.

Once the specification is received (or developed), the facilitator 400 (or in some cases a project manager, review board member, or some combination thereof) reviews the specification to determine if it meets the requirements for a complete specification according to the design development methodology 220. The methodology can include best-practice activities, templates, guidelines, and standards that assist the design developers in producing quality designs in a consistent and efficient manner. The use of such a methodology reduces the need to rethink and recreate the presentation of the design, thus reducing project duration and cost, and increasing quality.

Once complete, the specification is distributed via the communications server 212 to one or more design developers 404, 404', 404" (generally, 404), who may be members, for example, of a distributed community of designers such as the community 212 shown in FIG. 2. In one non-limiting example, the designers 404 are not related to each other. For example, the design developers may have no common employer, may be geographically dispersed throughout the world, and in some cases have not previously interacted with each other. However, as members of the community 212, the design developers 404 may have participated in one or more previous design competitions, and/or have had previously submitted designs subject to reviews. This approach allows an entity 208 to gain access to a large pool of qualified design developers.

The communication can occur over a communications network such as the network 112 (FIG. 1), such as via an email, instant message, text message, a posting on a web page accessible by the web browser 116, through a news group, facsimile, or any other suitable communication. In some embodiments, the communication of the specification can be accompanied by an indication of a prize, payment, or other recognition that is available to the designer(s) that submit selected software design(s). In some cases, the amount and/or type of payment may change over time, or as the number of participants increases or decreases, or both. In some cases multiple designers may be rewarded with different amounts, for example a larger reward for the best design, and a smaller reward for second place. The number of designers receiving an award can be based on, for example, the number of designers participating in the design project, or other similar attributes.

The recipients of the specification can be selected by various means. In some embodiments, members of the community may have expressed interest in participating in a design development project, whereas in some cases the individuals are selected based on previous performances in design competitions, prior development projects, or other methods of measuring the skill of a design developer. For example, the members of the distributed community of design developers may be design developers who have previously participated in a design competition, or (e.g., in the case of software designs) an on-line programming and/or coding and/or component design competition, or (e.g., in the case of other designs) have demonstrated or claimed relevant expertise. In such a case, the skills of the participants may have been rated according to their performance, either individually, as a team, or in relation to others, and the ratings may be used to determine which design developers are eligible to receive notification of a new specification or respond to a notification.

In one embodiment, the facilitator 400 moderates a collaborative forum among the various participants (the external entity 208, the developers 404, etc.) to determine, discuss, or collaborate on design features. The collaborative forum can consist of developers, customers, prospective customers, or others interested in the development of certain designs. In one embodiment, the collaboration forum is an online forum where participants can post ideas, questions, suggestions, or other information. In some embodiments, only a subset of the forum members can post suggestions to the forum.

Upon receipt of the specification, one or more developers 404 each develop designs (STEPS 412, 412' and 412") in accordance with the specification. The development of the design can be done using any suitable development system, for example, the design development software 224 provided via the communication server 216, a development environment provided by the developer 404, or some combination thereof. Once a developer 404 is satisfied that her design meets the specified requirements, and follows the development methodology 220, she submits her design e.g., via the communications server 216, facsimile, email, mail, or other method.

To determine which design will be selected, a design review process (STEP 414) is used. This design review can take place in any number of ways. In some cases, the facilitator 400 can delegate the review process to one or more members of the distributed community of designers, or an appointee of the entity. The design review process, in some embodiments, includes one or more design developers 404 acting as a design review board to review design submissions from other designers. In one embodiment, the design review board has a small number of (e.g., less than ten) members, for example, three members, but can be any number. Generally, the review board is formed for only one or a small number of related projects, for example three projects. Review boards, in some embodiments, could be formed for an extended time, but changes in staffing also can help maintain quality.

Preferably, one member of the design review board members is selected as the primary review board member by the facilitator 400 and/or the project manager, the members of the review board, and/or the external entity requesting the design. In some cases, the facilitator 400 or a representative of the facilitator 400 acts as the primary review board member. In such cases, the primary review board member is responsible for coordination and management of the activities of the board.

In one embodiment, submissions for software designs are judged by the design review board. In some embodiments, the primary review board member screens the design submissions before they are reviewed by the other members of the design review board, to allow the rest of the review board to judge only the best of the submissions. In some embodiments, the screening process includes scoring the submissions based on the degree to which they meet formal requirements outlined in the specification (e.g., format and elements submitted). In some embodiments, scores are documented using a scorecard, which can be a document, spreadsheet, online form, database, or other electronic document. The design review board may also, in some cases, verify the anonymity of the developers 404 such that their identities cannot be discerned from their submissions.

A screening review can determine whether the required elements of the design are met (e.g., color selection, color range, required text, size and resolution of graphic images, etc.).

In one embodiment, the primary review board member informs the design review board that one or more submissions have passed the initial screening (STEP 416), and the design review board then evaluates the design submissions in greater detail, for example by reviewing the submissions based on requirements documented in the specification. In some embodiments, the design review board scores the submissions (STEP 418). In some embodiments, the scores are documented using a scorecard, which can be any form, including a document, spreadsheet, online form, database, or other electronic document.

In some embodiments, the scores and reviews from the primary review board member and the other members of the design review board are aggregated into a final review and score. In some embodiments, the aggregation can comprise compiling information contained in one or more documents. Such aggregation can be performed by the primary review board member, the other members of the design review board, or in one exemplary embodiment, the aggregation is performed using a computer-based system which resides on the server 104 (FIG. 1). In some embodiments, the facilitator 400 or the primary review board member resolves discrepancies or disagreements among the members of the design review board.

In one embodiment, the design(s) with the highest combined score is selected as the winning design (STEP 420). A prize, payment and/or recognition is given to the designer. There can also be prizes, payments, and/or recognition for the other submitted designs. For example, the designers that submit the second and third best designs may also receive payment, which in some cases may be less than that of the winning designer. Payments may also be made for creative use of technology, submitting a unique design, or other such submissions. In some embodiments, the design developers can contest the score assigned to their design, program, or other submissions.

In some embodiments, in addition to reviewing the submissions, the design review board can identify useful modifications to the design that should be included in the design. The primary review board member documents the additional requirements, and communicates this information to the designer 404 who submitted the design. In one embodiment, the primary review board member aggregates the comments from the review board. The designers 404 can update the design and resubmit it for review by the design review board. This process can repeat until the primary review board member believes the design has met all the necessary requirements.

Once the design review board validates that a design has sufficiently addressed the requirements of the specification, the primary review board member notifies the facilitator 400, product manager, or external entity that such a design has passed the design review process. The design can then be provided to the entity that requested the design.

In one embodiment, the design review process 414 is conducted in concert with a community of reviewers. In one such embodiment, the developed designs are first screened (STEP 416) to determine whether the required elements of the design are met. One or more screeners (who may be a review board member, a facilitator 400, or any other designated individual) verify compliance with the specification. The screener may work with the designers to resolve any problems with the design, depending on the predetermined rules, the timing of the submission, and the nature of the problem.

In one embodiment, once the screener identifies design submissions that have met some or all of the requirements of the specification, the designs are reviewed by a number of reviewers. There may be any number of reviewers. In one embodiment there are between 10 and 50 reviewers. In one embodiment, there are between 10 and 100 reviewers. In one embodiment there are between 10 and 1000 reviewers. In one embodiment, there are between 100 and 5000 reviewers. In another embodiment there are more than 5000 reviewers. The reviewers review the submitted designs and rate them, for example in the manner described above, but it may be a simpler review than that as described with the design review board, for example, just a rating of preference, with no other criteria requested.

It should be understood that the review of the designs can take place in any suitable way, depending on the number of reviewers and the number of designs.

In one embodiment, one or more screeners determine whether submissions have met the formal requirements of the specification (STEP 416), for example, that a submission is complete and that the design has met the required file formats and documentation. A review board of a small number of reviewers (e.g., 1, 3, or 5) reviews the submissions (STEP 418) and evaluates the designs for objective compliance with the specification. For example, if text is required, the reviewers review the text to determine whether it is present and correct to meet the requirements of the specification. The review board may also review the designs for aesthetic or other more subjective criteria. The results of the review board are evaluated, and a predetermined number of "best" designs are selected (STEP 420), based on the results of the review board's evaluation. Prizes or awards may be given to the designers whose designs met this selection. In one embodiment, the "best" designs are then provided to a larger group of reviewers. The larger group of reviewers can use the same criteria as the review board, or can provide a simpler like/dislike feedback, or a preference rank. Each of the designs presented to the larger group are the ones that have most closely met the specification criteria, so the larger group can be used to determine the design(s) that have a more general appeal. Also, the review board typically will include experienced design developers, while the larger group might include more members of the intended audience for the design.

It also should be understood that in various implementations, the review by one or more screeners, by one or more design review board members, and by one or more members of the larger group can take place in any order. It also should be understood that there can be any number of participants in the various levels of review. Thus, in one embodiment, a larger group is used as a first stage of review, to reduce the set of submissions to a small number of candidates, and then the smaller number of candidates are reviewed by a smaller group. In another embodiment, a smaller group is used as a first stage of review, to reduce the set of submissions to a small number of candidates, and then the smaller number of candidates are reviewed by a larger group. Likewise, there may be multiple levels of review (not shown), in which larger or smaller groups participate in the review. In one such embodiment, increasingly larger groups of reviewers (e.g., three, four, or more groups of reviewers) are consulted as the number of candidates is reduced. In another embodiment, increasingly smaller groups of reviewers (e.g., three, four, or more groups of reviewers) are consulted as the number of candidates is reduced.

In one embodiment, the selected design(s) (STEP 423) are used iteratively as input for another round of development. The design(s) are included, as part of the requirements 406 and specification 410 for another round of development. The entity that requested the design can further refine the specification based on the results from the previous round. For example, if an initial repetition of the method results in the selection of three designs, those three designs can be included in the specification, with an indication of the aspects of those features that are desired. In the revised specification, designers may be asked to include aspects of those features in their submissions in a following round.

In another embodiment, the results from a part of the development cycle (e.g., prior to the selection by a larger group of reviewers) are included in another specification. For example, in one embodiment, the members of the design review board, which includes members of the entity requesting the design, identify one or more designs from the initial screening 416 that have desirable features, but are not themselves acceptable as a whole design. Instead of continuing the process as described above and sending the designs for review by the larger group of reviewers, the design review board selects those designs that have desirable features to be the winners, so that the designers of the designs can be appropriately rewarded. The selected designs are then incorporated (STEP 424) into a revised specification, which is then communicated to the design developers.

It is also possible to stop at other possible places in the process, and revise the specification with additional information (external information, or information generated by the process) so long as the design developers feel that they are treated properly by the change in process.

In iterative embodiments, there can be any number of rounds in which output from one round is used as part of the input for the next round. Through such an iterative process, e.g., by taking the output 423, 424 and using that as input for another round, it is possible for the entity that is requesting the designs to come incrementally closer to a desired design, with a process that allows freedom and creativity for the design developers within the guidelines of the specification.

Figure 5:
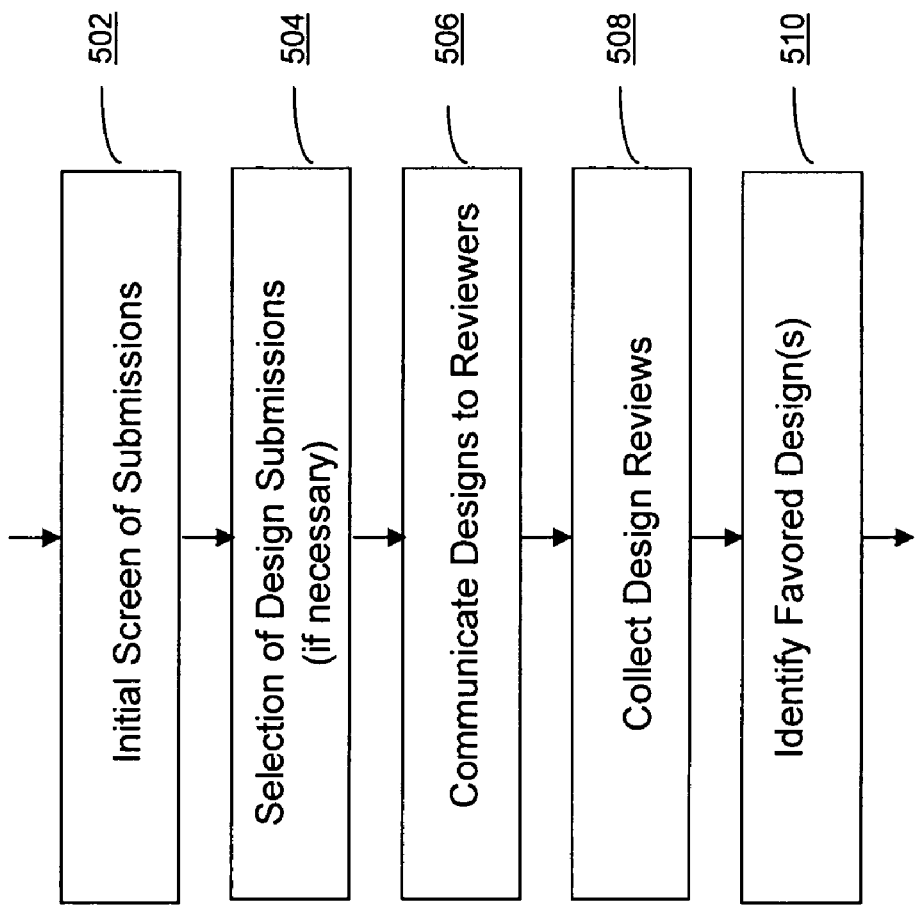
FIG. 5 is a flow chart depicting steps performed in developing a design according to an embodiment of the invention.

Referring to FIG. 5, in one embodiment, a screener, who may or may not be a member of the review board, performs the screening of the designs as described above (STEP 502) to eliminate as a candidate design any design that does not meet the requirements. If the design does not meet the requirements, the screener may inform the designer and allow resubmission, depending on the selection rules.

The design review board, which may be one (e.g., the one screener) or a group of people, selects a number of the submitted designs that meet the requirements, for review by a large number of reviewers (STEP 504). If there are an appropriate number of submissions, there may be no need for any further review. But, if there are a large number of submissions, the number of submissions may be reduced to a smaller number. One goal of such reduction may be to facilitate selection by a larger group, by narrowing the candidate field.

Another goal of the reduction may be to select the candidates that are viewed most favorably by the members design review board. The design review board can include, for example, the screener, the facilitator, representatives of the entity that requested the design, customers of the entity that requested the design, focus groups comprised of members of the public (or the potential audience for the design), and so on. Once this selection of candidate design submissions has taken place, then reviewers can be presented with the candidates for evaluation.

For example, in one exemplary embodiment, after screening, there are 25 design submissions that meet the criteria of the requirements. The design review board decides that because of the nature of the design, it would be best to provide reviewers with 10 candidates from which to choose. The design review board selects the 10 designs that the members believe to be the best candidates. In another context, the reviewers might present all 25 to the larger group of reviewers. There may even be situations where many more candidates are presented to the larger group. In general, however, a goal is to provide the review group with a smaller number of choices, so as to reduce the time and effort needed by each member of the larger group of reviewers.

The number of designs selected can be any number that is suitable for selection by a larger group. For example, in one embodiment, designs are eliminated until 10 designs are left. In another embodiment, designs are eliminated until 20 designs are left. This additional selection of designs that meet the requirements may only be necessary if there are a large number of designs submitted. The designs may be evaluated for such exemplary factors as appearance, presentation of desired themes, color selection, and the like. The design review board can "cull" designs that the design review board members do not perceive as favorable to a set that they would find acceptable.

Depending on the number of members of the design review board, there are different techniques that can be used to select the candidates. In one embodiment, the system facilitates the review by the design review board members by presenting the choices to the members, with a mechanism to provide feedback. The feedback can be a simple indication of the preference of each (e.g., yes/no, or number evaluation) or a ranking (e.g., assigning an order of preference) to each. Any suitable technique can be used to solicit and aggregate response indicia from the design review board members. In one embodiment, each design review board member gets one or more "veto" votes to eliminate a candidate that he doesn't like.

The design review board can interact with the communication server 104, for example, using client software 124, to review the submissions and select the submissions that should be provided to the reviewing community.

In one embodiment, the design review board also considers a review of the design from the perspective of authorship and intellectual property issues. For example, the design review board can consider how similar the design submissions are to designs offered by competitors or others, to further a potential goal that the design, if selected, will not raise concerns from third-parties. The design review board may also consider the protectability of the design, with regard to copyright and trademark law. This may involve legal review, or other techniques to eliminate potential problems that may be raised by the set of candidates. Although potentially more time consuming to consider a number of candidates at this stage, rather than once a single choice is selected, it may be preferable to do so in some situations.

Once the candidate set is identified, the design review board can then consider the opinions of a larger group to determine select one or more "best" designs. The system solicits review of the selected submissions from a larger group of reviewers (STEP 506). The larger group of reviewers may be the intended audience for the design, for example, customers and potential partners of the company whose logo is being designed. The larger group of reviewers may be, in the case of a web page interface, for example, potential users of the web page. The larger group of reviewers may include other design developers, members of the requesting entity (e.g., employees of the company such as sales and marketing personnel), or any other suitable group or combination of groups of people. In one embodiment, the reviewers include people who are not affiliated with the entity, but who have agreed provide their opinion about the design. The demographics (e.g., where they live, what language(s) do they speak, their ages, incomes, etc.) of the larger group of reviewers may be important considerations in selecting the larger group.

The larger group of reviewers may be compensated in some way for their participation. For example, the reviewers may be provided with monetary or other rewards or prizes, or the opportunity to participate in a lottery for such reward. Participation in one or more larger groups of reviewers may be a requirement for submission of a design. For example, in one embodiment, a design developer needs to participate in a predetermined number of larger group reviews during a predetermined time period (e.g., week, month, calendar quarter) to have an ability to submit designs.

The larger group reviewers may be ranked and/or rated, for example based on how reliable they are, how quickly they respond, and/or how well their selections comport with the selection of the larger group(s) in the review(s) that they participate in.

In one embodiment, the larger group of reviewers are invited by email to review the designs. Each of the larger group of reviewers receives an email message directing them to a web page that includes the list of candidate designs. In the case of a logo, the candidates are displayed on the page, with any additional information needed for review, as well as a selection tool for assigning response indicia. For example, if there are ten candidate designs, each design can be assigned a response indicia from 1 to 10, and the reviewer is asked to assign a number to each design in order of the reviewer's preference for the design. In another example, the reviewers are asked to evaluate specific characteristics of the design (e.g., color, text layout, thematic representation, etc.) and/or give an overall evaluation or preference. The specific characteristics may be evaluated individually, or by assigning a number to each in order of preference. In another example, a free-form text entry field may be provided where the reviewers can describe the specific attributes (color, text, graphics, layout, etc.) of each design that they like or dislike.

While any suitable interface can be used, presenting the designs in a manner that allows each candidate design to be compared to each other, facilitates efficient review by each reviewer. It also allows for effective aggregation as described below. If the designs can not easily be compared on the same page, there can be an indicator for the design on the review page, for example with a summary image for the design, and links to the full presentations of the candidate designs. Any suitable system for providing a response indicia can be used, depending on the method used for aggregating the results. Generally, a web page is used to collect the reviewers feedback on the designs (STEP 508). Any suitable technique may be used, including without limitation selection by telephone, mobile telephone, and so on.

After review, the results from the reviewers can be aggregated, for example, by any suitable method, to identify the most preferred design(s) (STEP 510). For example, in one embodiment, the Schulze method is used for the comparison. The Schulze method has the advantage that if there is a candidate that is preferred pairwise over the other candidates, when compared in turn with each of the others, the Schulze method guarantees that that candidate will win. Other methods that are Condorcet methods (i.e., promote the pairwise winner) are also may be suitable, as may be any other suitable voting system, such as Borda and Instant-runoff voting.

In general, it can be useful to select a number of candidates in their order of preference, and also to communicate how close the response was from the larger group of reviewers with regard to the top selections. For example, the requesting entity may not prefer the top choice selected by the reviewers, but might prefer to select on its own from the top choices determined by the larger group. The requesting entity may conduct other review (e.g., marketing surveys, international review, legal review) of the most highly evaluated design, and it may turn out to raise legal concerns that would foreclose adoption.

When a design is selected, the original design developer can be engaged to do additional work with the design or another design developer can be engaged. Typically, the design developer's submission will include all of the information and documentation (including electronic copies of the design in appropriate formats) such that the design is usable in its intended context.

In one embodiment, design developers that submit designs are rated based on the results of their submissions. The ratings are calculated based on the ratings of each design developer prior to the submission, and such other factors as an assigned difficulty level of the design submitted, and the number of other design developers making submissions, and the feedback received for the design. If the difficulty is used in the rating, an assessment of the difficulty of the project will be made when it is accepted. Generally, the amount paid for a project bears a strong relationship to the difficulty of the project, and so it may be possible to use one to determine the other. A skill rating is calculated for each design developer based on each developer's rating prior to the submission and a constant standard rating (e.g., 1200), and a deviation is calculated for each developer based on their volatility and the standard rating.

The expected performance of each design developer submitting a design is calculated by estimating the expected score of that design developer's submission against the submissions of the other design developers' submissions, and ranking the expected performances of each design developer. The submission can be scored by a reviewer using any number of methods, including, without limitation, those described above. The submission can be scored based on one or more metrics, or on the result of whether the submission candidate is ultimately selected. Thus, an expected score may be a score, or a reflection of the expectation that the submission will be one of the best design(s) selected.

Based on the score of the submitted software and the scores of submissions from other design developers (e.g., whether for the same design or one or more other programs having a similar level of difficulty), each design developer is ranked, and an actual performance metric is calculated based on their rank for the current submission and the rankings of the other design developers. In some cases, the submissions from other design developers used for comparison are for the same design. In some cases, the submissions from other design developers are submissions that are of similar difficulty or scope.

A competition factor also can be calculated from the number of design developers, each design developer's rating prior to the submission of the design, the average rating of the design developers prior the submissions, and the volatility of each design developer's rating prior to submission.

Each design developer can then have their performance rated, using their old rating, the competition factor, and the difference between their actual score and an expected score. This performance rating can be weighted based on the number of previous submissions received from the design developer, and can be used to calculate a design developer's new rating and volatility. In some cases, the impact of a design developer's performance on one submission may be capped such that any one submission does not have an overly significant effect on a design developer's rating. In some cases, a design developer's score may be capped at a maximum, so that there is a maximum possible rating. The expected project performance of each design developer is calculated by estimating the expected performance of that design developer against other design developers and ranking the expected performances of each participant. The submissions and participants can be scored by the facilitator 400, the entity 208, a review board member, and/or automatically using the software residing, for example, on the server 104 using any number of methods.

One such example of scoring methodology is described in U.S. Pat. No. 6,569,012, entitled "Systems and Methods for Coding Competitions" by Lydon et al, at, for example, column 15 line 39 through column 16 line 52, and column 18 line 65 through column 21 line 51, and incorporated by reference in their entirety herein. The methodology is described there with reference to programming competitions, and is applicable to rating the development of designs, as well as data models, applications, components, and other work products created as a result of using the methodology described above.

In one embodiment, after each competition, each design developer who submitted a solution to the competition is re-rated according to the following algorithm, based on the last 50 scored designs, excluding the design developer's own previous submissions. (Another number may be used instead of 50, for example, 30, 80, 100, or another other number.) The ranking of each design developer is then determined based on the score the design developer received compared to the scores of the last 50 scored components. The rating used for the previous scores is the rating of the design developer at the time the design developer submitted the solution. The average rating of everyone is then calculated:

$$AveRating = \frac{\sum_{i=1}^{NumCoders} Rating_i}{NumCoders}$$

Where NumCoders is the number of design developers in the competition and Rating is the rating without the volatility of the design developer in the competition before the competition.

The competition factor is calculated:

$$CF = \sqrt{\frac{\sum_{i=1}^{NumCoders} Volatility_i^2}{NumCoders} + \frac{\sum_{i=1}^{NumCoders} (Rating_i - AveRating)^2}{NumCoders - 1}}$$

Where Volatility is the volatility of the design developer in the competition before the competition.

Win Probability Estimation Algorithm:

$$WP = 0.5\left(erf\left(\frac{Rating1 - Rating2}{\sqrt{2(Vol1^2 + Vol2^2)}}\right) + 1\right)$$

Where Rating1 & Vol1 are the rating and volatility of the design developer being compared to, and Rating2 & Vol2 are the rating and volatility of the design developer whose win probability is being calculated. Erf is the "error function," which in this implementation is the error function encountered in integrating the normal distribution (which is a normalized form of the Gaussian function).

The probability of the design developer getting a higher score than another design developer in the competition (WPi for i from 1 to NumCoders) is estimated. The expected rank of the design developer is calculated:

$$ERank = .5 + \sum_{i=1}^{NumCoders} WP_i$$

The expected performance of the design developer is calculated:

$$EPerf = -\Phi\left(\frac{ERank - .5}{NumCoders}\right)$$

Where $\Phi$ is the inverse of the standard normal function.

The actual performance of each design developer is calculated:

$$APerf = -\Phi\left(\frac{ARank - .5}{NumCoders}\right)$$

Where ARank is the actual rank of the design developer in the competition based on score (1 for first place, NumCoders for last). If the design developer tied with another design developer, the rank is the average of the positions covered by the tied design developers.

The performed as rating of the design developer is calculated:

PerfAs=OldRating+CF*(APerf−EPerf)

The weight of the competition for the design developer is calculated:

$$Weight = \frac{1}{\left(1 - \left(\frac{.42}{(timesPlayed + 1)} + .18\right)\right)} - 1$$

Where TimesPlayed is the number of times the design developer has been rated before.

To stabilize the higher rated members, the Weight of members whose rating is between 2000 and 2500 is decreased 10% and the Weight of members whose rating is over 2500 is decreased 20%.

A cap is calculated:

$$Cap = 150 + \frac{1500}{1 + TimesPlayed}$$

The new volatility of the design developer is calculated:

$$NewVolatility = \sqrt{\frac{(NewRating - OldRating)^2}{Weight} + \frac{OldVolatility^2}{Weight + 1}}$$

The new rating of the design developer is calculated:

$$NewRating = \frac{Rating + Weight * PerfAs}{1 + Weight}$$

If |NewRating−Rating|>Cap the NewRating is adjusted so it is at most Cap different than Rating.

Although described here with reference to certain designs, and useful when implemented with regard to aesthetic, artistic, or graphic designs, the cooperatively developed work product can be any sort of tangible or intangible object that embodies intellectual effort or intellectual property. As non-limiting examples, the techniques could be used for computer hardware and electronics designs, or other designs such as architecture, construction, music, or landscape design. Other non-limiting examples for which the techniques could be used include the development of all kinds of written documents and content such as documentation and articles for papers or periodicals (whether on-line or on paper), research papers, scripts, multimedia content, legal documents, and more.

What is claimed is:

1. A system for providing designs comprising graphical and/or creative design elements by conducting a multi-round development process with a distributed community of designers, comprising:

a communications module for electronically distributing a first specification comprising requirements for a design comprising graphical and/or creative design elements to a distributed community of designers and for receiving designs comprising graphical and/or creative design elements from each of a subset of the community of designers in response to the design requirements, and for electronically distributing a second specification comprising refinements of the first specification based on received designs;

a screening module for identifying received designs that meet the specifications;

an evaluation and ranking of module for facilitating evaluation of a subset of the received designs by a customer that requested the design;

a selection module for selecting preferred designs in response to the facilitated evaluation of the designs.

2. The system of claim 1, wherein the designs are ranked according to predetermined criteria.

3. The system of claim 2, wherein the evaluation module facilitates scoring using a scorecard.

4. The system of claim 1, wherein the designs comprise a web site design.

5. The system of claim 1, wherein the design comprise a design for a software application.

6. The system of claim 5, wherein the software application may be provided over the internet as a web-based application.

7. The system of claim 6, wherein the specification comprises one or more requirement selected from the set of requirements of: type of design, size of the design, size and color requirements, desired or undesired themes for the design, background information for creating the design, acceptable files type and format, and required documentation.

8. The system of claim 1, wherein the screening module facilitates comparing received designs with specification requirements.

* * * * *